UNITED STATES PATENT OFFICE.

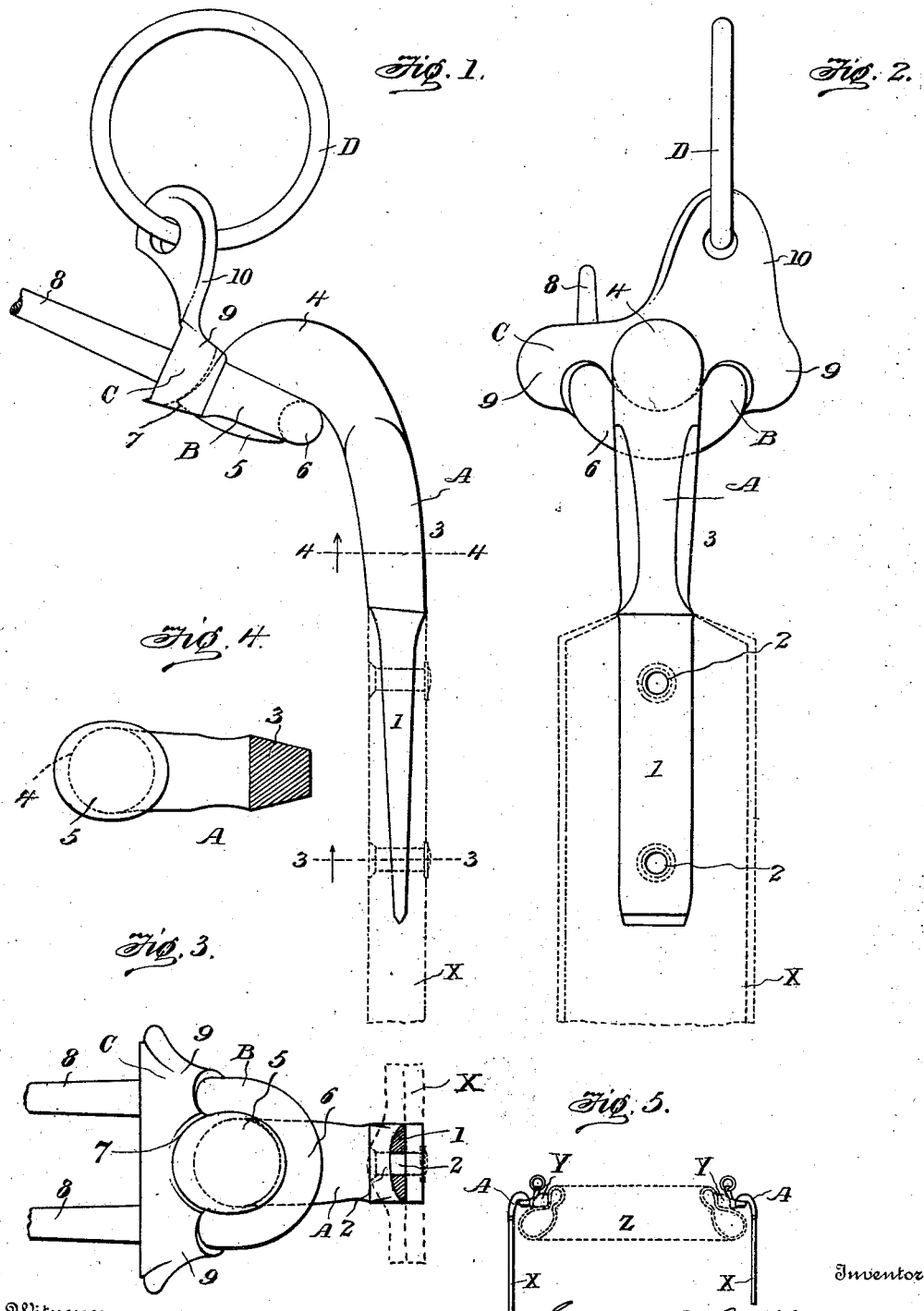

GEORGE B. WITHERS, OF MARION, IOWA.

HAME AND TRACE CONNECTOR.

SPECIFICATION forming part of Letters Patent No. 709,950, dated September 30, 1902.

Application filed August 1, 1901. Serial No. 70,483. (No model.)

*To all whom it may concern:*

Be it known that I, GEORGE B. WITHERS, a citizen of the United States of America, and a resident of Marion, in the State of Iowa, have invented a new and useful Improvement in Hame and Trace Connectors, of which the following is a specification.

This invention relates to improved devices for connecting the hames of single or double harness with the traces or tugs; and it consists in the combination, with a hame-staple and its plate or bearing, of a clip-iron of novel construction for that purpose and in a combined hame-clip, staple, and hold-out bearings of specific construction, as hereinafter set forth and claimed.

The leading object of the invention is to embody in a practicable form what I term the "hold-out" principle, having reference to keeping the hame end of the trace or tug out of contact with the collar and shoulder of the horse; and the advantages of the improved device over those in common use are, first, it dispenses with pressure on the collar where the clip is secured to the hame-tug or trace, and thus avoids wear at this point of the collar and also injury to the shoulder of the horse directly beneath the clip; second, the clip is attached to the hame-tug or trace in the line of draft, and breaking the hame-tug or trace at the end of the clip is thus avoided; third, the front ends of the hame-tugs or traces are spread apart, so that they will not chafe the shoulders of the horse; fourth, the collar is protected against damage in the same way; fifth, the customary wear-leather on the hames is dispensed with; sixth, the draft is distributed equally on the collar and on the shoulder of the horse; seventh, the improved device provides the maximum of wearing surfaces on the clip-iron and on the staple and hold-out bearing, and consequently has greater durability.

A sheet of drawings accompanies this specification as part thereof.

Figure 1 of the drawings is a top view of the parts in working positions. Fig. 2 is a side view projected from Fig. 1. Fig. 3 is a sectional view projected from Fig. 1, with the section on the line 3 3. Fig. 4 is a like view of the hame-clip alone, partly in cross-section on the line 4 4, Fig. 1; and Fig. 5 is a diagrammatic sectional plan view showing a pair of hames and traces in their relation to a collar.

Like letters and numbers refer to like parts in all the figures.

The front end of a hame-tug or trace is shown in dotted lines in Figs. 1, 2, and 3 at X. For connecting the same with a hame of any known or improved kind I combine a hame-clip A, a staple B, and a hold-out bearing C, all of peculiar construction, the latter being also conveniently provided for double harness with a holdback-ring D. The clip A is rigidly attached to the front end of the hame-tug or trace by a tang 1, that is preferably semi-oval in cross-section, as shown in Fig. 3, so as to have an "oval" side toward the collar and horse, which reduces liability to damage by the edges of the hame-tug or trace. The tang is fastened within the tug or trace by two or more rivets 2, Figs. 2 and 3. A rigid body 3 projects endwise from the tang 1 and curves laterally toward the hame, as in Fig. 1, and terminates in a strong rounded neck 4 and a flaring head 5, adapted, respectively, to sustain the draft strains and the backing or displacement and hold-out strains, with the necessary provision for pivotal movements of the clip. To coact with said neck 4 and head 5 of the clip A, the staple B is constructed with a relatively heavy rounded bow 6, and the hold-out bearing C is constructed with a rounded notch 7 in its back, the surfaces of which merge into each other and are loosely fitted to said neck 4 and to the adjoining side of said head 5, as in Fig. 1. A pair of legs 8, which complete the staple B, are loosely fitted to sockets 9 in the bearing C, and a perforated lug 10 on the latter adapts it to carry the holdback-ring D.

A pair of hames to each of which a set of the parts A, B, and C is attached are represented at Y in Fig. 5 and an ordinary collar at Z, a pair of traces and the lines of draft being represented at X. As represented in this figure, the hame-tugs or traces X are held out away from the collar and from the sides of the horse and are attached to the clips in the lines of draft. Instead of local pressure and pressure inward the pressure due to the draft is distributed to the pair of hames and the collar as a whole by the coaction of the clips A, staples B, and hold-out bearings C.

In heavy teaming, especially when with ordinary hame-clips the pressure would be directly upon the shoulder-blades of the horse, lessening his power and resulting in damage to the shoulders, all such damage is prevented by the improved device, while wear is reduced by the absence of contact between the hame-tugs or traces and the collar and by the distribution of wear in the metallic parts.

The parts A, B, C, and D may be drop-forgings of steel or iron or malleable castings of any suitable metal and may be adapted as to external shape and finish to any size and style of single or double harness in which wooden or metallic hames are used, and other like modifications will suggest themselves to those skilled in the art.

Having thus described said improvement, I claim as my invention and desire to patent under this specification—

1. A hame-clip adapted to be rigidly attached to the front end of a hame-tug or trace in the line of draft, and constructed with a rigid body curved laterally toward the hame and terminating in a strong rounded neck and a flaring head, in combination with a staple having a bow through which said neck extends and against the front of which it is adapted to pull, and a hold-out bearing against which said flaring head of the clip is adapted to press at the back of the staple, substantially as hereinbefore specified.

2. A combined hame-clip, staple and hold-out bearing comprising a clip adapted to be rigidly attached to the front end of a hame-tug or trace in the line of draft, and constructed with a rigid body curved laterally toward the hame and terminating in a strong rounded neck and a flaring head, a staple having a heavy rounded bow and a hold-out bearing constructed with a rounded notch in its back, the surfaces of said bow and bearing merging into each other and loosely fitted to said neck and to the adjoining side of said head of the clip, substantially as hereinbefore specified.

GEO. B. WITHERS.

Witnesses:
C. H. KURTZ,
T. G. WHITE.